June 5, 1956  F. COLOMBO  2,748,664
MOLD CUTTING MACHINE
Filed Dec. 4, 1952  3 Sheets-Sheet 1
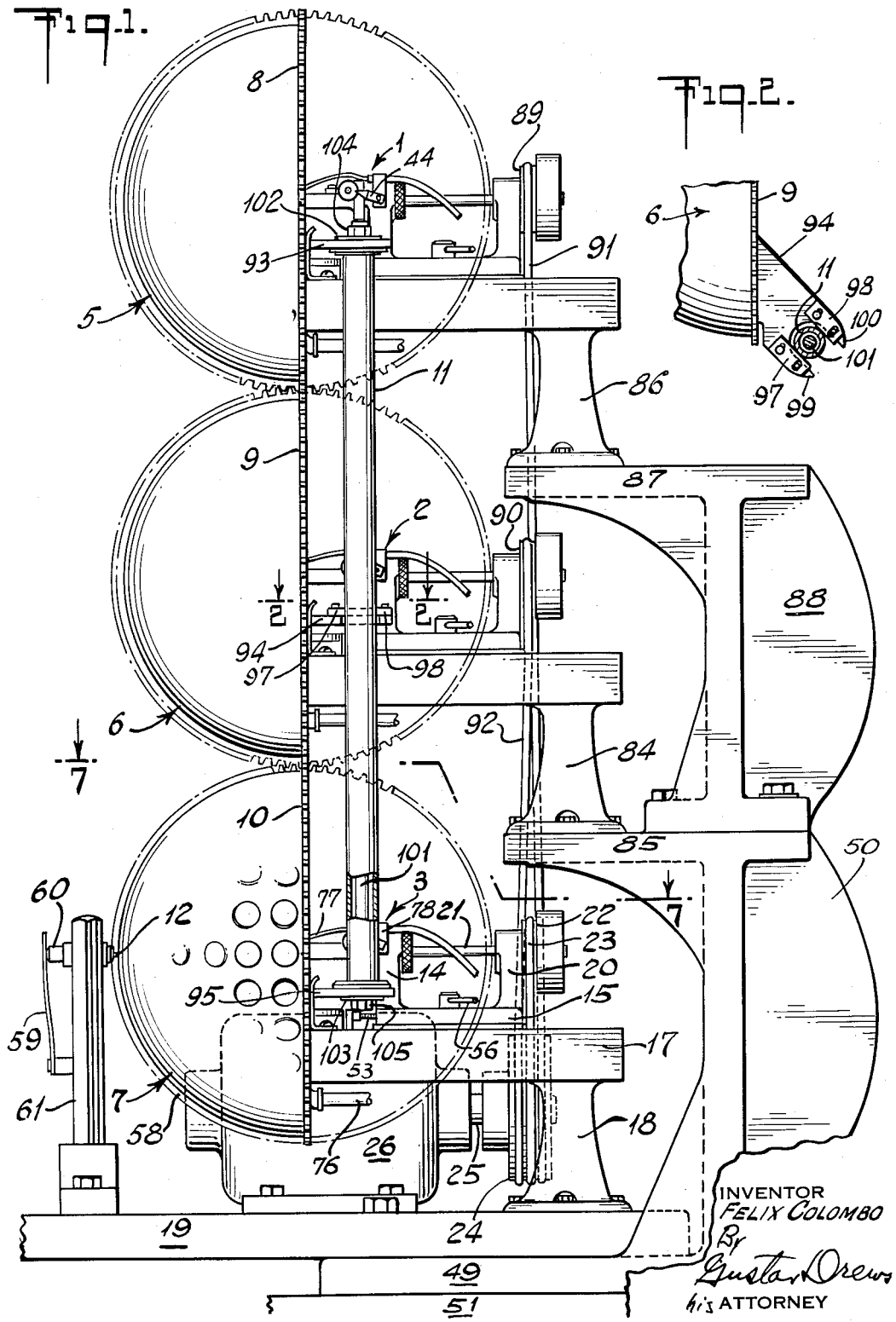
INVENTOR
FELIX COLOMBO
By Gustav Drews
his ATTORNEY

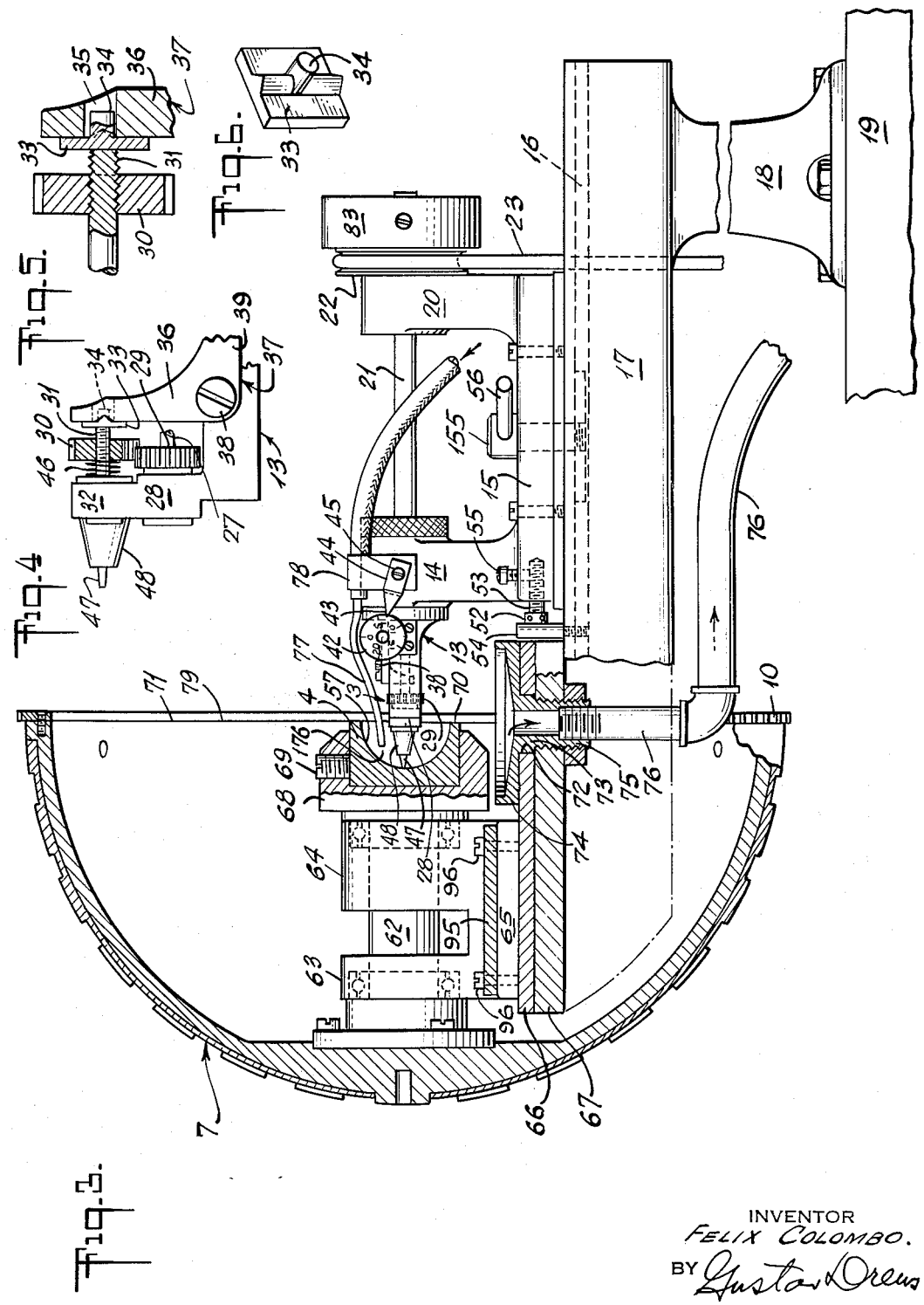

June 5, 1956

F. COLOMBO 2,748,664

MOLD CUTTING MACHINE

Filed Dec. 4, 1952

INVENTOR
FELIX COLOMBO
BY Gustav Drews
his ATTORNEY

United States Patent Office 2,748,664
Patented June 5, 1956

2,748,664
MOLD CUTTING MACHINE

Felix Colombo, St. Albans, N. Y., assignor to Atti Engineering Corp., Union City, N. J., a corporation of New Jersey Application December 4, 1952, Serial No. 324,080

13 Claims. (Cl. 90—13.3)

This invention relates to mold cutting machines in general, and more particularly to mold cutting machines for cutting designs in semi-spherical molds, conventionally known as cups for golf balls and the like.

Among the objects of the present invention, it is aimed to provide an improved mold cutting machine for cutting designs in the semi-spherical face of the mold conventionally known as a cup which will enable cutting not only an accurate and precise design in the portion of the face removed from the edge thereof, but also in the face adjacent to, and at, the free edge of the semi-spherical face of the cup.

It is still another object of the present invention to provide an improved mold cutting machine for cutting designs in the semi-spherical faces of golf ball mold cups whereby the cutting tool can with facility be set to a predetermined depth with precision.

It is still another object of the present invention to provide an improved mold cutting machine characterized by a plurality of cutting tools and cup holding chucks operatively connected to a single guide whereby a plurality of cups may be simultaneously cut.

These and other features, capabilities and advantages of the present invention will appear from the subjoined detailed description of one specific embodiment thereof illustrated in the accompanying drawings, in which Fig. 1 is a side elevation partly broken away of the mold cutting machine.

Fig. 2 is a fragmental detail on the line 2—2 of Fig. 1.

Fig. 3 is a section enlarged of one of the units partly broken away.

Fig. 4 is a plan view still further enlarged partly broken away of the cutting tool holder.

Fig. 5 is a fragmental section still further enlarged of a part of the cutting tool holder.

Fig. 6 is a perspective of a portion of the cutting tool holder shown in Fig. 5.

Figure 7:
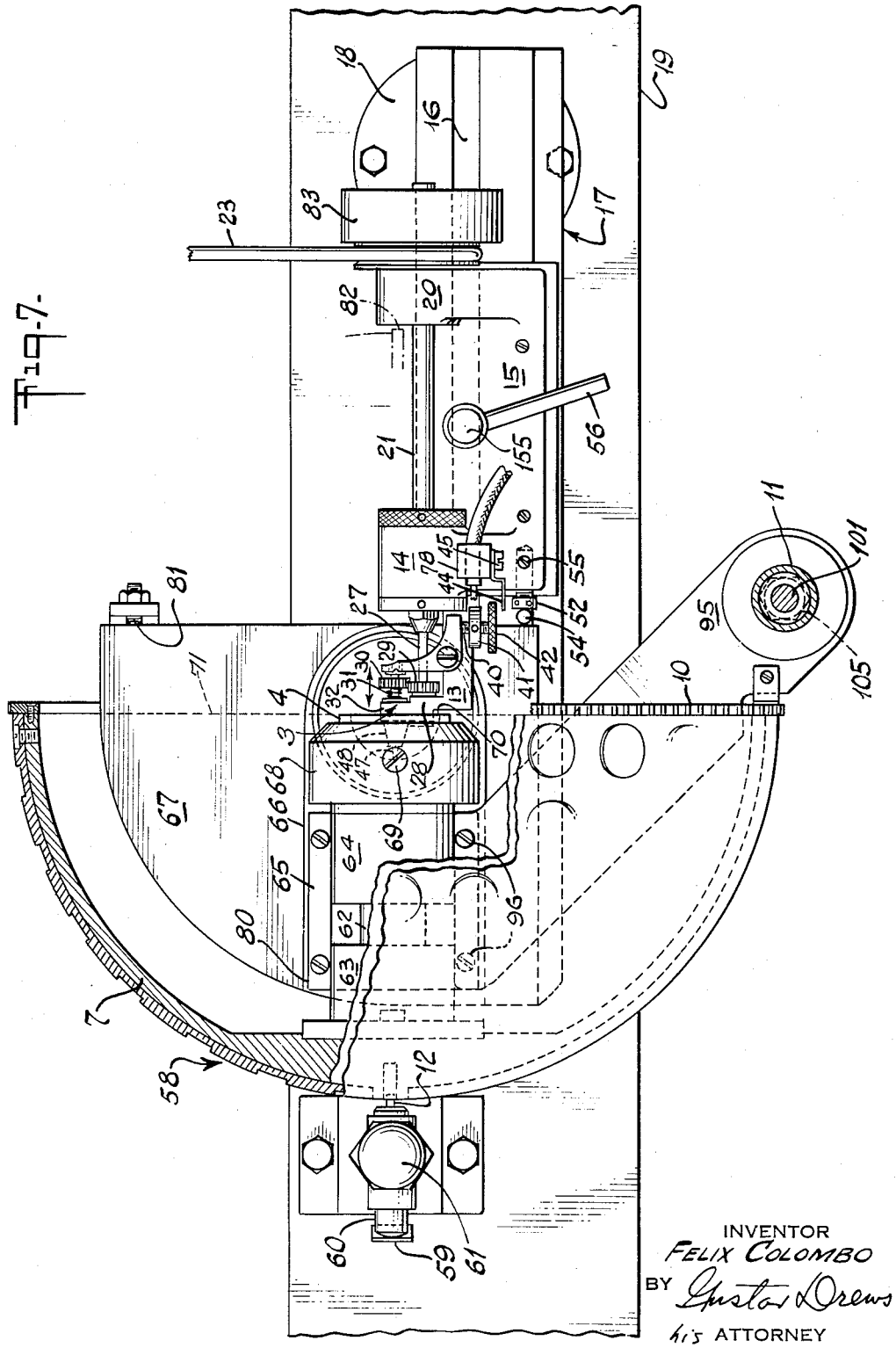
Fig. 7 is a plan view partly broken away and in section on the line 7—7 of Fig. 1.

In the embodiment shown in Fig. 1 there are illustrated three cutting units 1, 2 and 3 which are operatively connected simultaneously to cut identical molds or cups 4 mounted in the frames 5, 6 and 7, respectively, which are rotatable about horizontal axes and connected to rotate with one another about such horizontal axes by means of the annular rows of gear teeth, 8, 9 and 10 formed on the frames 5, 6 and 7, respectively, with the teeth 8 in mesh with the teeth 9, and the teeth 9 in turn in mesh with the teeth 10. Furthermore, the frames 5, 6 and 7 are also rotatable about a vertical axis and are connected to the upright 11 which extends parallel to the vertical axis of rotation of the frames 5, 6 and 7, but is disposed eccentric thereto so that actuation of the upright 11 will simultaneously swing all three frames about the vertical axis. The interconnection of the three frames 5, 6 and 7 will subsequently be described more in detail after one of the cutting units 3 and its associated frame 7 has been further described.

Since the frames 5 and 6 will be actuated simultaneously with the frame 7, it will suffice if the frame 7 alone is provided with a design master and this master operatively connected to the stylus 12. Furthermore, since the frame 7, cutting unit 3 and their association with one another is substantially identical either to the frame 5, cutting unit 1 and their association, or to the frame 6, cutting unit 2 and their association, the frame 7, including unit 3 and their association with one another will be described in detail and a description of the additions and differences alone added.

The frame 7 and cutting unit 3, as will appear from Fig. 1, is disposed in the present instance at the bottom, or constitutes the lowermost of the three machines, the frame 6 being disposed above the frame 7, and the frame 5 in turn above the frame 6. The cutting unit 3 includes a bracket 13 which extends forwardly of the upright 14 formed on, and extending forwardly from, the base plate 15, longitudinally slidable in the bed 16 of the arm 17 extending forwardly from the supporting arm 18 secured to the platform 19.

The base plate 15 also has extending upwardly therefrom the upright 20 in which is journalled the driven shaft 21 having a pulley 22 on the rear end to receive the belt 23 which connects the pulley 22 with the three sheave pulley 24 mounted on the drive shaft 25 of the motor 26 mounted on the platform 19. The shaft 21 is also journalled in the upright 14 and has secured to and extending from its front end the smaller shaft 27 which in turn is journalled at its front end in the laterally extending arm 28 of the bracket 13. On the shaft 27 there is fixed the gear 29 disposed just to the rear of the arm 28. This gear 29 in turn meshes with the gear 30 fixed on the shaft or pin 31 rotatably and slidably mounted in the end portion or extension 32 of the arm 28 and abutting at its rear end against, but not secured to, the plate 33 having the pin 34 resting in the opening 35 of the arm 36 of the bell crank 37 journalled by the pin 38 secured to the bracket 13, the bell crank 37 thus constituting a lever fulcrumed on the bracket 13. The rearwardly extending arm 39 of the bell crank 37 cooperates with the free end of the pin 40 screw threadedly mounted in the bearing 41 and provided with a knurled disk 42, the outer face of which, see Fig. 3, is provided with graduations numbered "0," "5," "10," "15" and "20" to pass beneath the pointed end 43 of the pointer 44 secured by the screw 45 to the side of the upright 14. By means of the disk 42 the pin 31, which is screw threadedly connected to the gear 30, is positioned in the extension 32 in opposition to the spring 46 tensed between the extension 32 and the gear 30 and encircling the pin 31. The pin 31 otherwise is freely slidable in the extension 32 and is conformed at its front end into the cutting blade 47 which extends a short distance beyond the cone extension 48 formed on the extension 32 to serve as a bearing for the shank or pin 31 of the cutting blade 47. The graduations on the outer face of the disk 42 will cooperate with the pointer 44 to enable the operator to adjust the position of the cutting blade 47 relative to the cup 4, see Fig. 3, the required distance for the cut to be produced.

The platform 19 in the present instance is mounted on the horizontal extension 49 of the bracket 50 mounted on the bench 51. In turn the base plate 15 when moved into its operative position, that shown in Fig. 3, has the head 52 at the free end of the set screw 53 engaging the stop pin 54 secured to the arm 17 and extending upwardly therefrom to form a limiting stop for the forward position of the base plate 15 and to determine the operative position of the same. The set screw 53 is preferably secured in its predetermined position by the vertically extending pin 55. When the head 52 of the set screw 53 engages the stop pin 54 as shown in Fig. 3, the base plate 15 may be locked in position by the pin 155 engaging the bed 16 of arm 17 and operated by the lever 56. In operation the cutting unit 3 is first advanced to the left where the head 52 engages the stop pin 54 and the cutting blade 47 just engages the face 57 of the cup 4 to be engraved or cut, thereupon the belt 23 is operatively connected to the pulleys 22 and 24 to cause the shaft 21 to be actuated and the blade 47 to be rotated. Then the disk 42 will be actuated to cause the blade 47 to cut into the cup 4 the distance required for the design to be engraved and thereafter merely actuate the frame 7 according to the design of the master 58 formed on the outer spherical face of the frame 7, the valleys or receding face portions of the master 58 being traced and retraced by the stylus 12 until the blade 47 completely clears the thickness or portion of the cup corresponding to the receding face portion of the master 58. So that the stylus 12 may effectively engage the receding face portion of the master 58, any suitable means such as the leaf spring 59 is provided exercising pressure on the outer end of the shank 60 of the stylus 12 which is slidably mounted in the opening formed in the upper end of the upright 61 extending upwardly from the platform 19.

The frame 7, see Figs. 3 and 7, is secured to the horizontally extending spindle 62 rotatably mounted in the journals 63 and 64 extending upwardly from the base plate 65 and secured to the platform 66 slidably mounted on the plate portion 67 of the arm 17. The right hand end of the spindle 62 in the present instance is provided with a work holder 68 conformed to receive the cup 4 and provided with a set screw 69 to secure the cup 4 against displacement when positioned in the work holder 68. The cup 4, work holder 68 and frame 7 are so formed and connected relative to one another that the convex spherical face of the frame 7 will be concentric to the concave spherical face 57 of the cup 4 and the outer face 70 of the cup 4 aline with the outer edge 71 of the frame 7, which edge 71 coincides with the equator of the semispherical frame 7 formed at the outer edge thereof. The platform 66 in turn has an opening 72 to receive the hub 73 of the oil funnel 74 which is screw threadedly connected to the plate portion 67 of the arm 17 to form a chambered nipple 75 for screw threadedly receiving the upper end of the conduit 76 connected to the lubricating oil supply not shown, so that the oil fed to the cutting tool 47 may be received by the funnel 74 and then drained back through the conduit 76 to the lubricating oil supply and thereupon repumped to the cutting tool 47. In the present instance the center of the nipple 75 coincides with the center of rotation of the frame 7. Should there be but one frame 7 to be operated, then this frame 7 will be engaged by the operator and turned about its vertical axis and its horizontal axis as desired without regard to any other frames, such as the frames 5 and 6. Since the metal of the cup 4 is preferably composed of a hard high grade steel, such as tool steel, to reduce the heat generated by friction during the cutting action, the steady stream of oil is pumped onto the cutting tool blade 47 where it engages the cup 4, the oil flowing from the discharge end 176 of the oil feed conduit 77 anchored in position by the clip 78 to the upper end of the upright 14.

The bracket 28, see particularly Figs. 3 and 4, permits the frame 7 to be turned about its vertical axis on the imaginary line 79 passing through the center of rotation of the platform 66 until the edge of the base plate 65 at about the point 80 strikes or engages the left free end of the stop pin 81 mounted on and secured at the edge of the fixed plate portion 67. In this position it will appear that the outer free edge of the annular row of teeth 10 will be swung over to intersect the imaginary point 82 to one side of the shaft 21, see Fig. 7, in which position the contact portion of the cutting blade 47 will be able to cut to the very edge of the concave face 57 of the cup 4 adjacent to the outer face 70 of the cup 4. It will thus be seen that in the interest of accuracy the axis of the pin 31 of the cutting blade 47 will still aline with the horizontal axis of the cup 4 which in turn alines with the horizontal axis of the frame 7, but that the driven shaft 21 has been positioned off center, that is, spaced from the line of the horizontal axis aforesaid a sufficient distance to enable the edge of the frame 7 to pass to the right of the contact point of the cutting blade 47. It will also appear that due to the slidable mounting of the pin 31, and in turn the slidable relation of the gear 30 with the gear 29, and the floating connection between the bell crank 37 and the pin 31, made possible by the plate 33, the required depth of the cutting blade 47 may with facility be adjusted by the disk 42 without disturbing its position on the horizontal axis of rotation of the cup 4 and in turn of the frame 7.

In order to avoid any chattering of the cutting blade 47 during the cutting operation, the right hand end of the shaft 21 is preferably provided with a weighted fly wheel 83.

In the interest of speeding up production, one and the same master 58 associated with the frame 7 may be connected to a plurality of frames, two additional frames 5 and 6 being shown in the present instance by way of example. The rotation of the frames 5 and 6 about horizontal axes parallel to the horizontal axis of the frame 7 is effected by providing the annular rows of gear teeth 10, 9 and 8 on the frames 7, 6 and 5, respectively, the teeth 10 of the frame 7 in mesh with the teeth 9 of the frame 6 and the teeth 9 in turn in mesh with the teeth 8 of the frame 5. In such case the cutting units 1 and 2 will depart primarily from the cutting unit 3 in that the upright 84 equivalent to the upright 18 is mounted on the short platform 85 of the bracket 50, and that the upright 86 of the cutting unit 1 equivalent to the uprights 18 and 84 is mounted on the short platform 87 of the bracket 88 mounted on the bracket 50. Furthermore, the driven pulleys 89 and 90 of the cutting units 1 and 2, respectively, in place of the pulley 22 of the cutting unit 1 will be connected by the belts 91 and 92, respectively, to the multiple sheave pulley 24.

In view of the foregoing, if the horizontal axes of the frames 5, 6 and 7 were fixed, it will be seen that the rotation of the frame 7 will simultaneously cause the frames 5 and 6 to be rotated. Furthermore, as is the case with the present machine, the frames 5, 6 and 7 will simultaneously rotate not only about horizontal axes as aforesaid, but also rotate simultaneously about the vertical axis defined by the line 79. This is accomplished by connecting the base plates 65 of the three frames 5, 6 and 7 by the arms 93, 94 and 95, respectively, to the upright or guide bar 11. These arms 93, 94 and 95 in the present instance are secured to the base plates 65 of the cutting units by screws, such as the screws 96. The end of the arm 94, see Fig. 2, is bifurcated and is provided with two jaws 97 and 98 adjustably mounted on the bifurcations 99 and 100, respectively, equipped to anchor into locking engagement with the outer face of the chambered upright 11. This upright 11 in turn is mounted on the rod 101 which extends at its upper end through an opening in the outer end of the arm 93 and at its lower end through an opening in the outer end of the arm 95 where the ends of the rod are secured in position by washers 102 and 103, respectively, and the nuts 104 and 105, respectively, are screw threadedly connected to the upper and lower ends of the rod 101.

I claim:

1. In a machine for cutting a design in the semispherical concave surface of a work piece, the combination of a base, a stylus mounted on said base, a design master having a convex design conforming surface engaged by said stylus to guide said design master, a bracket, a support extending upwardly from said base and pivotally supporting said bracket to rotate about a vertical axis, said bracket in turn pivotally supporting said design master to rotate about a horizontal axis, a work-holder secured to and inside of said design master and supporting the work piece having the concave surface to be cut concentric to the convex surface of said design master with the poles of said concave and convex surfaces on the same horizontal axis, a second support mounted on said base, a short driven shaft journalled in said second support, a cutting tool mounted on said driven shaft to rotate with said driven shaft about an axis that intersects both the vertical and horizontal axes of said design master with the cutting tool and driven shaft clear of the path of movement of said design master when swung into position for a cutting operation adjacent the outer edge of the concave surface, a driving mechanism operatively mounted on said second support and having a drive shaft parallel to said driven shaft and operatively connected to said driven shaft and spaced a sufficient distance from said driven shaft to clear the path of movement of said design master when swung into position for a cutting operation adjacent the outer edge of the concave surface, said driven shaft being slidably mounted on said second support, a bell crank pivotally mounted on said second support, means effecting a slidable engagement between said bell crank and said slidable shaft determining the position of said slidable shaft relative to the work piece, and a set screw on said second support in engagement with said bell crank in turn determining the position of said bell crank.

2. In a machine for cutting a design in the semispherical concave surface of a work piece, the combination of a base, a stylus mounted on said base, a design master having a convex design conforming surface engaged by said stylus to guide said design master, a bracket, a support extending upwardly from said base and pivotally supporting said bracket to rotate about a vertical axis, said bracket in turn pivotally supporting said design master to rotate about a horizontal axis, a work holder secured to and inside of said design master and supporting the work piece having the concave surface to be cut concentric to the convex surface of said design master with the poles of said concave and convex surfaces on the same horizontal axis, a second support mounted on said base, a short driven shaft journalled and slidably mounted in said second support, a cutting tool mounted on said driven shaft to rotate with said driven shaft about an axis that intersects both the vertical and horizontal axes of said design master with the cutting tool and driven shaft clear of the path of movement of said design master when swung into position for a cutting operation adjacent the outer edge of the concave surface, a driving mechanism operatively mounted on said second support and having a drive shaft parallel to said driven shaft and operatively connected to said driven shaft and spaced a sufficient distance from said driven shaft to clear the path of movement of said design master when swung into position for a cutting operation adjacent the outer edge of the concave surface, a lever fulcrumed on said second support, means effecting a slidable engagement between said lever and said slidable shaft determining the position of said slidable shaft relative to the work piece, and means on said second support in engagement with and determining the position of said lever.

3. In a machine for cutting a design in the semispherical concave surface of a work piece, the combination of a base, a stylus mounted thereon and fixed in operative position, a frame having a semi-spherical convex surface, a design master on said convex surface engaged by said stylus to guide said design master, a bracket, a support extending upwardly from said base and pivotally supporting said bracket to rotate about a vertical axis, said bracket in turn pivotally supporting said frame to rotate about a horizontal axis, a work holder secured to and inside of said frame to support the work piece having the semi-spherical concave surface concentric to the convex surface of said design master with the poles of said surfaces on the same horizontal axis, a second support mounted on said base, a short driven shaft journalled in said second support, a cutting tool mounted on said driven shaft to rotate with said driven shaft about an axis that intersects both the vertical and horizontal axes of said frame with the cutting tool and the driven shaft clear of the path of movement of said frame when swung into position for a cutting operation adjacent the outer edge of the concave surface, a driving mechanism operatively mounted on said second support having a drive shaft parallel to said driven shaft and operatively connected to said driven shaft but spaced a sufficient distance from said driven shaft to clear the path of movement of said frame when swung into position for a cutting operation adjacent the outer edge of the concave surface, said driven shaft being slidably mounted on said second support, a bell crank pivotally mounted on said second support, a float engaging said slidable shaft, said bell crank operably engaging said float and determining the position of said float relative to the work piece, and a set screw on said second support in engagement with said bell crank in turn determining the position of said bell crank.

4. In a machine for cutting a design in the semispherical concave surface of a work piece, the combination of a base, a stylus mounted thereon and fixed in operative position, a frame having a semi-spherical convex surface, a design master on said convex surface engaged by said stylus to guide said design master, a bracket, a support extending upwardly from said base and pivotally supporting said bracket to rotate about a vertical axis, said bracket in turn pivotally supporting said frame to rotate about a horizontal axis, a work holder secured to and inside of said frame to support the work piece having the semi-spherical concave surface concentric to the convex surface of said design master with the poles of said surfaces on the same horizontal axis, a second support mounted on said base, a short driven shaft journalled and slidably mounted in said second support, a cutting tool mounted on said driven shaft to rotate with said driven shaft about an axis that intersects both the vertical and horizontal axes of said frame with the cutting tool and the driven shaft clear of the path of movement of said frame when swung into position for a cutting operation adjacent the outer edge of the concave surface, a driving mechanism operatively mounted on said second support having a drive shaft parallel to said driven shaft and operatively connected to said driven shaft but spaced a sufficient distance from said driven shaft to clear the path of movement of said frame when swung into position for a cutting operation adjacent the outer edge of the concave surface, a lever fulcrumed on said second support, a float engaging said slidable shaft, said lever operably engaging said float and determining the position of said float relative to the work piece, and means in engagement with and determining the position of said lever.

5. The combination as set forth in claim 4 in which the stylus will engage the pole of the design master when the horizontal axis of the design master coincides with the axis of said cutting tool.

6. In a machine for cutting a common design in the semi-spherical concave surfaces of a plurality of work pieces, the combination of a main frame having a plurality of bases, each of said bases having a bracket and a support, said support extending upwardly from its base and pivotally supporting its bracket to rotate about a vertical axis, a work holder pivotally connected to each bracket to rotate about a horizontal axis, each holder supporting a work piece having one of the concave surfaces to be cut, a second support mounted on each base, a driven shaft journalled in each of said second supports, a cutting tool mounted on each driven shaft to rotate with said driven shaft about an axis that intersects both of said vertical and horizontal axes, an upright parallel to said vertical axis, arms fixedly connecting each of said brackets to said uprights to enable simultaneously turning all of said brackets about said vertical axis, a frame having a gear ring pivotally connected to each of said brackets to rotate about horizontal axes that are parallel to one another, said gear rings being identical to, and in mesh with, one another and having parallel axes to enable them to be simultaneously rotated about their respective horizontal axes, a design master having a semi-spherical convex design forming surface secured to one of said frames, the gear ring of said latter frame being disposed at the free circumferential edge of said convex design, said convex surface being concentric to the concave surface of its associated work piece with the poles of the concave and convex surfaces on the same horizontal axis, a stylus mounted on the base supporting said one frame and engaging the convex surface of its associated design master to guide said design master, and a plurality of driving mechanisms, each of said driving mechanisms operatively mounted on one of said second supports with its associated cutting tool and driven shaft clear of the path of movement of its associated gear ring when swung into position for a cutting operation adjacent the outer edge of the concave surface of its associated workpiece, and operatively connected to its associated driven shaft to clear the path of movement of its associated gear ring when swung into position for a cutting operation adjacent the outer edge of the concave surface of its associated work piece.

7. The combination as set forth in claim 6, in which each driven shaft is slidably mounted on its associated second support, a bell crank pivotally mounted on each second support and operatively connected to its associated slidable shaft to determine its position relative to its associated work piece, and a set screw on each second support in engagement with its associated bell crank in turn to determine its position.

8. The combination as set forth in claim 6 in which the stylus will engage the pole of the design master when the horizontal axis of the design master coincides with the axis of said cutting tool.

9. The combination as set forth in claim 6 in which each second support is slidably mounted on its base to enable its cutting tool to be removed from engagement with its work piece.

10. The combination as set forth in claim 6 in which each second support is slidably mounted on its base to enable its cutting tool to be removed from engagement with its work piece, a device for anchoring each second support with its cutting tool in engagement with the concave surface of its work piece before initiating the cutting operation, and a micrometer set screw on each second support in engagement with its associated bell crank to advance the cutting tool to the depth required after a cutting operation has been initiated.

11. The combination as set forth in claim 6 in which each driven shaft is slidably mounted on its associated second support, a lever fulcrumed on each second support and operatively connected to and determining the position of its associated shaft relative to its associated work piece, and means in engagement with and determining the position of each lever.

12. The combination of a work piece having a semi-spherical concave surface, a base, a stylus secured to said base, a design master having a spherical design conforming surface engaged by said stylus to guide said design master, a bracket, a support secured to said base and pivotally supporting said bracket to rotate about a first axis, said bracket in turn pivotally supporting said design master to rotate about a second axis perpendicular to said first axis, a work holder secured to rotate with said design master and supporting said work piece having the concave surface to be cut in alinement with the spherical surface of said design master with the pole of the concave surface of said work piece and the pole of the spherical surface of said design master on the same line, a second support secured to said base, a short driven shaft journalled in said second support, a cutting tool mounted on said driven shaft to rotate with said driven shaft about an axis that intersects both of the first and second axes of said work piece with the cutting tool and driven shaft clear of the path of movement of said work piece when swung into a position for a cutting operation adjacent the outer edge of the concave surface of said work piece, a driving mechanism operatively mounted on said second support and having a drive shaft parallel to said driven shaft and operatively connected to said driven shaft and spaced a sufficient distance from said driven shaft to clear the path of movement of said work piece when swung into position for a cutting operation adjacent the outer edge of the concave surface of said work piece, said driven shaft being slidably mounted on said second support, a bell crank pivotally mounted on said second support, means effecting a slidable engagement between said bell crank and said slidable shaft determining the position of said slidable shaft relative to the work piece, and a set screw on said second support in engagement with said bell crank in turn determining the position of said bell crank.

13. In a machine for cutting a design in the semi-spherical concave surface of a work piece, the combination of a base, a stylus secured to said base, a design master having a semi-spherical design conforming surface engaged by said stylus to guide said design master, a bracket, a support secured to said base and pivotally supporting said bracket to rotate about a first axis, said bracket in turn pivotally supporting said design master to rotate about a second axis at right angles to said first axis, a work holder secured to rotate with said design master and supporting the work piece having the concave surface to be cut parallel to and in alinement with the spherical surface of said design master with the pole of the concave surface of said work piece and the pole of the spherical surface of said design master on the same line, a second support secured to said base, a short driven shaft journalled and slidably mounted in said second support, a cutting tool mounted on said driven shaft to rotate with said driven shaft about an axis that intersects both of the first and second axes of said work holder with the cutting tool and driven shaft clear of the path of movement of said work holder when swung into position for a cutting operation adjacent the outer edge of the concave surface of the work piece, a driving mechanism operatively mounted on said second support and having a drive shaft parallel to said driven shaft and operatively connected to said driven shaft and spaced a sufficient distance from said driven shaft to clear the path of movement of said work holder when swung into position for a cutting operation adjacent the outer edge of the concave surface of the work piece, a lever fulcrumed on said second support, means effecting a slidable engagement between said lever and said slidable shaft determining the position of said slidable shaft relative to the work piece, and means on said second support in engagement with and determining the position of said lever.

References Cited in the file of this patent

UNITED STATES PATENTS

| | | |
|---|---|---|
| 452,169 | Tyler et al. | May 12, 1891 |
| 1,112,730 | Trivers et al. | Oct. 6, 1914 |
| 2,058,395 | Atti | Oct. 27, 1936 |
| 2,297,551 | Greve | Sept. 29, 1942 |